(12) United States Patent
Jämiä

(10) Patent No.: US 7,799,257 B2
(45) Date of Patent: Sep. 21, 2010

(54) METHOD FOR FURNISHING A SHEET EDGE BY A STRIP

(76) Inventor: Aulis Jämiä, Jämijärventie 28, FI-38800, Jämijärvi (FI)

( * ) Notice: Subject to any disclaimer, the term of this patent is extended or adjusted under 35 U.S.C. 154(b) by 493 days.

(21) Appl. No.: 10/582,512

(22) PCT Filed: Dec. 13, 2004

(86) PCT No.: PCT/FI2004/000756

§ 371 (c)(1),
(2), (4) Date: Jun. 9, 2006

(87) PCT Pub. No.: WO2005/057682

PCT Pub. Date: Jun. 23, 2005

(65) Prior Publication Data

US 2007/0096363 A1    May 3, 2007

(30) Foreign Application Priority Data

Dec. 12, 2003   (FI) .................................. 20031822

(51) Int. Cl.
*B29C 47/02* (2006.01)
*B29C 47/78* (2006.01)
(52) U.S. Cl. .................. 264/252; 264/272.11; 264/273
(58) Field of Classification Search ............ 264/252, 264/171.22, 272.11, 273, DIG. 71; 204/281
See application file for complete search history.

(56) References Cited

U.S. PATENT DOCUMENTS

| | | | | |
|---|---|---|---|---|
| 3,239,402 A | * | 3/1966 | Ecklund et al. | ............. 156/200 |
| 5,332,538 A | * | 7/1994 | Levinson et al. | ............ 264/492 |
| 5,336,349 A | | 8/1994 | Cornils et al. | |
| 5,736,086 A | * | 4/1998 | Jones et al. | ............ 264/171.17 |
| 5,928,482 A | | 7/1999 | Marttila | |
| RE37,341 E | | 8/2001 | Cornils et al. | |
| 2002/0030301 A1 | * | 3/2002 | Honig | ................... 264/171.13 |
| 2002/0076527 A1 | * | 6/2002 | Hanai et al. | ................. 428/192 |

FOREIGN PATENT DOCUMENTS

| | | |
|---|---|---|
| EP | 0 028 284 | 5/1981 |
| EP | 0 067 060 | 12/1982 |
| JP | 7 304 085 | 11/1995 |

* cited by examiner

*Primary Examiner*—Joseph S. Del Sole
*Assistant Examiner*—Robert Dye
(74) *Attorney, Agent, or Firm*—Stites & Harbison PLLC; Douglas E. Jackson

(57) ABSTRACT

A method to furnish the edge portion of sheet (1) with a strip, as a strip (2) of plastic material using device (3) comprising a die space (7). The edge of sheet (1) is fitted inside device (3) that feeds plastic material to die space (7) and by means of restrictive organs (8) and die surfaces, of which device the escape of heated plastic material from a die space (7) is avoided, the sheet is arranged to move in regard to the feeding (3) device, the sheet edge being inside said device, die space (7) of device (3) is heated during the process.

6 Claims, 2 Drawing Sheets

METHOD FOR FURNISHING A SHEET EDGE BY A STRIP

Figure 1:
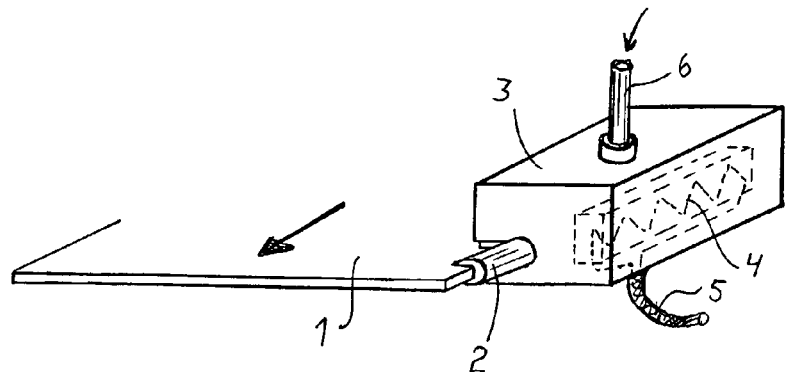

The invention relates to a method to furnish the edge portion of a sheet with a strip, as a strip of plastic material using a device comprising a die space. The invention relates especially to anode and cathode sheets used in the processing industry, the edges of which must by means of a plastic strip be kept electrically non-conductive.

Previously known is an injection moulding method of plastic material, where on using a die, of the material an object similar to the die is produced. Also known are die applications, where before injection moulding into the die ready-made objects are placed, for instance metal objects wholly or partly fitted in the die. The plastic strip meant for the sheet edge could be accomplished with such a die-casting die in length of the sheet edge, where the sheet edge would have been taken into the die, cast and die of the strip could be opened and the sheet with its strips removed. As example of this patent specification U.S. Pat. No. 5,928,482 can be mentioned.

A production process of this kind requires a long and expensive die. The compactness on the die would be complicated and perhaps impossible on using high injection moulding pressures. One edge of the sheet could be done at a time and even slight variations of thickness cause immediate compaction problems in the die. It can also be considered to fit a ready-made profile strip in some way on the sheet edge, which is however a difficult method and by means of it a sufficient fuse of strip on the sheet surface is not reached so that the oxygen of the electrolytic bath could not get in between strip and sheet.

Further known from publications EP 028284, EP 707937 and U.S. Pat. No. 5,336,349 is a method to produce an edge portion of plastic material using an extrusion device comprising the die space. In these ones the edge is placed into the die space of the extrusion device and the sheet is moved in regard to the die space. The adhesiveness of the strip cannot be secured in the above presented applications, because the strip gets cool at first in the portions, where it is contact against the cold sheet edge.

In order to solve the above presented disadvantages and problems a new method is developed characterized in that the die space of the device is heated during the process and the sheet is heated in its edge portion at least 10-200° C. higher than the temperature of the plastic mass steered into the die.

The advantage of the invention is that furnishing the sheet edge with a plastic strip can be easily automated, when it is a process taking place on a moving track. The opposite edges of the sheet can be furnished with a strip at the same time. In the method a quite short extrusion die is sufficient, at which the feed of plastic material to the sheet edge takes place. Due to the short extrusion die the variations of sheet thickness can be compensated by packing lips. Due to proper temperature arranged for the material no high pressure is needed either in the die or the extruder; and by means of sheet edge preheating in the strip, a strong strip in the sheet keeping compression is achieved, and by cooling of the produced strip it is secured by shrinking which takes place lastly in the internal part of the strip.

Figure 2:
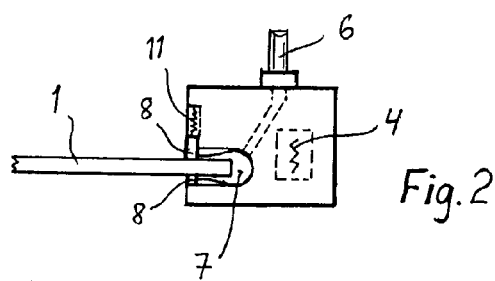
Figure 3A:
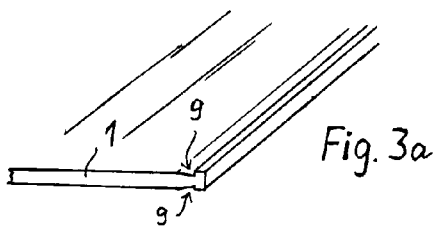
Figure 4:
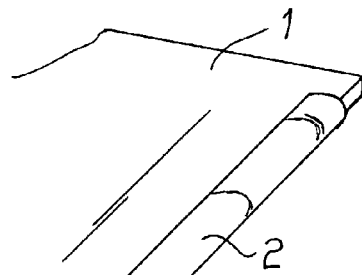
Figure 5:
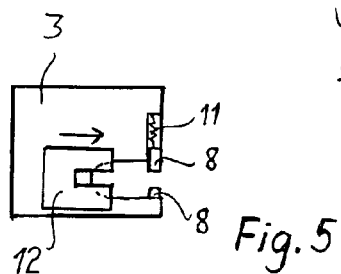
Figure 6:
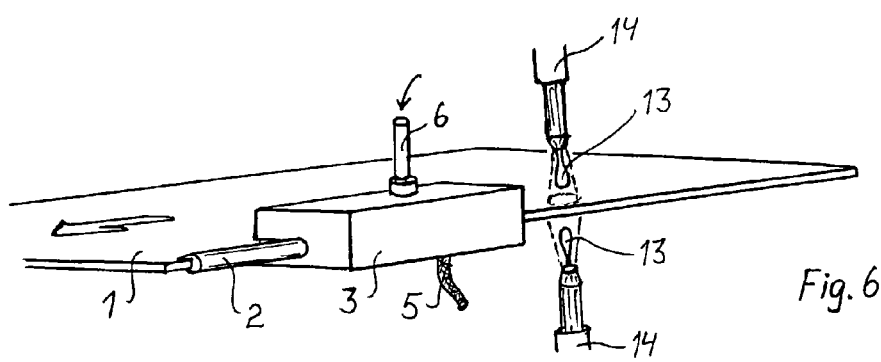
Figure 7:
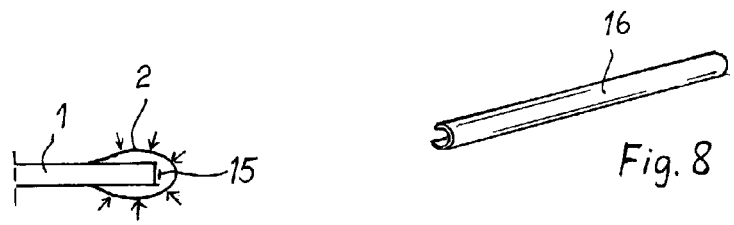
Figure 8:
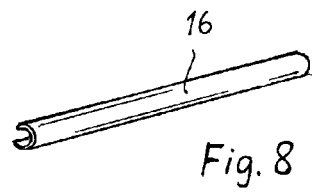

In the following the invention is disclosed with reference to the enclosed drawing, where FIG. 1 shows making of strip in the edge of moving sheet,
FIG. 2 shows the case of FIG. 1 viewed from the end,
FIGS. 3a and b show some edge shapes of the sheet,
FIG. 4 shows strip in sheet edge,
FIG. 5 shows a closing device of a die opening,
FIG. 6 shows heating of the sheet edge
FIG. 7 shows strip and sheet viewed from the end,
FIG. 8 shows the blowpipe pipe around the strip.

FIG. 1 shows preparation of plastic strip 2 to be made for the edge of moving sheet 1 by means of device 3. The edge of sheet 1 is steered to move through device 3. To device 3 heated plastic comes along tube 6. In device there is also a heating resistance 4 keeping the strip forming die included in the device in regulated temperature.

FIG. 2 shows the device from the end without any plastic fed into space 7. Space 7 is a die space reaching through device 3 defining the profile form of strip 2 being produced. The edge of sheet 1 is taken to die space 7. On the surface of sheet 1 the die space is pressed with restrictive organs 8, which are for instance dragging lips. These organs prevent the plastic material from getting farther on the sheet 1 surface than intended. The ends of die space 7 are open.

The opening of the die space 7 one end is completely stopped up by sheet 1 and removing strip 2. The inlet opening of the die space of sheet 1 is in this embodiment stopped up only by sheet 1. When through tube 6 plastic material is fed by pressure to die space 7 it fills the die space, sticks to the moving sheet and gets out together with the sheet as a ready-made list. Feed pressure and feed quantity into die space 7 is so regulated that the plastic material does not extrude faster than sheet 1 gets out through the output opening of die space 7. Also material is not allowed to extrude out of the inlet opening of the die space 7.

Figure 3B:
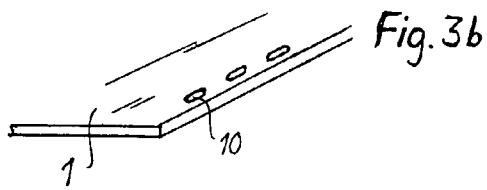

FIG. 3a shows groove 9 improving the adhesiveness of sheet 1 to the edge, and FIG. 3b shows a string of holes 10 also to improve the adhesiveness.

FIG. 4 shows ready-made strip 2 in the sheet edge. Thanks to strip 2 the sheet edge remains neutral and does not collect any copper on its surface, for instance.

FIG. 5 shows an application, where the inlet hole of sheet edge can be plugged also as to the portion, which the sheet edge does not plug. Baffle plate 12 is pushed tight to drags 8. The gap in baffle plate 12 is only a slightly greater than the sheet thickness.

FIG. 6 shows manufacture of strip 2 on sheet 1 edge, whereby sheet 1 is heated from both sides by means of burners 14. Flames 13 are steered to the area in the edge, onto which strip 2 is wanted to get stuck. Sheet 1 is heated to a temperature of about 10-200° C. warmer than the plastic mass in extrusion die 3. If the sheet is colder than plastic mass, immediately after extrusion the mass that forms strip 2 gets cool and hardens at first at its portions against sheet 1. After that the outmost portions of strip 2 get cool and shrink noticeably at the same time, whereby the skirts or ends of the strip open off the sheet. The temperature of sheet 1 before die 3 can be controlled for instance by means of pyrometric measurement. The intensity of temperature can be regulated on the basis of measuring in regulating the flame intensity or, for instance, regulating the distance of flame from the sheet.

In order to avoid the peeling phenomenon of strip described above it is necessary that sheet 1 is warmer than the plastic mass in extrusion die 3. This means that according to FIG. 7 at first the outer strip surfaces get cool and harden and after that, thanks to hot sheet 1, for instance the melted plastic mass in spot 15 finally gets cool and shrinks, whereby strip 2 remains in shrinking position around the sheet edge. The sheet edge can be heated by a gas flame, radiation heat or, for instance, by eddy-current principle. Strip 2 made on the sheet edge is immediately cooled most suitable by means of air blast, whereby the strip surface hardens first. The produced cooled strip 2 can be covered from one of its edges by means of open tube 16 (FIG. 8), which is fitted around the strip immediately after device 3 and to the inside of which the air flow is blasted. Thereby the air flow does not escape and a smaller blast is sufficient for strip cooling.

The invention claimed is:

1. A method to furnish an edge of an anode or cathode conductive sheet with a strip of plastic material using a device including a die space, the method comprising the steps of:
   providing the edge of the conductive sheet with holes to improve adhesiveness of the plastic strip to the conductive sheet,
   fitting the edge of the conductive sheet inside of the die space,
   feeding plastic material into the die space and around the sheet edge and into the holes which improves adhesiveness of the plastic strip to the conductive sheet,
   avoiding, by providing of restrictive organs and die surfaces about the die space, the escape of heated plastic material from the die space,
   moving the sheet in regard to the device with the sheet edge inside the die space of the device so that the plastic strip is adhered to the sheet edge,
   wherein the feeding step includes the step of heating the die space including the sheet edge during the moving step,
   wherein the fitting step includes the step of pre-heating the conductive sheet edge to a temperature at least 10-200° C. warmer than the temperature of the plastic material fed into the die space; and
   further including the step of cooling the strip and sheet edge so that the plastic material of outer strip surfaces of the strip cool and harden before plastic material of a spot of the strip immediately adjacent the sheet edge, wherein said cooling step further includes steering a cooling air flow only on the outer surface of the produced strip.

2. A method according to claim 1, wherein the feeding step includes the step of fixing a feed pressure of the plastic material fed into the die space low enough so that the plastic strip adhered to the sheet edge and running out from a discharge opening of the die space causes a comparable back pressure at the discharge opening.

3. A method according to claim 1, wherein the sheet edge is moved through the die space of the device.

4. A method according to claim 1, wherein the device is moved along the sheet edge.

5. A method according to claim 1, wherein the avoiding step further includes the provision, at an input end of the die space having opening portions which are spaced from the sheet, a plugging part by which the opening portions are always plugged.

6. A method according to claim 1, wherein the pre-heating step directs heat from a heat source directly to the edge of the conductive sheet.

* * * * *